(12) United States Patent
Henderson et al.

(10) Patent No.: US 8,404,024 B2
(45) Date of Patent: Mar. 26, 2013

(54) RECOVERY OF NF3 FROM ADSORPTION OPERATION

(75) Inventors: Philip Bruce Henderson, Allentown, PA (US); Patrick Michael Colleran, Macungie, PA (US); Forrest Eli Hulbert, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 378 days.

(21) Appl. No.: 12/760,843

(22) Filed: Apr. 15, 2010

(65) Prior Publication Data
US 2011/0100209 A1    May 5, 2011

(51) Int. Cl.
B01D 59/26 (2006.01)
(52) U.S. Cl. ............... 95/96; 95/104; 95/106; 95/148
(58) Field of Classification Search ............ 95/96, 104, 95/105, 106, 148; 96/130
See application file for complete search history.

(56) References Cited

U.S. PATENT DOCUMENTS

| | | | |
|---|---|---|---|
| 4,156,598 A | 5/1979 | Woytek et al. | |
| 4,933,158 A | 6/1990 | Aritsuka et al. | |
| 5,069,887 A | 12/1991 | Suenaga et al. | |
| 5,254,154 A | 10/1993 | Gauthier et al. | |
| 5,417,742 A | 5/1995 | Tamhankar et al. | |
| 5,425,240 A | 6/1995 | Jain et al. | |
| 5,620,501 A | 4/1997 | Tamhankar et al. | |
| 6,551,387 B2 * | 4/2003 | Abe et al. | 96/104 |

OTHER PUBLICATIONS

Yang, R.T.; "Gas Separation by Adsorption Processes"; Butterworths; Boston; 1987; pp. 171-172.
Weiss, R.F., et al; "Nitrogen Trifluoride in the Global Atmosphere"; Geophys. Res. Lett.; 35; 2008.

* cited by examiner

*Primary Examiner* — Robert A Hopkins
(74) *Attorney, Agent, or Firm* — Lina Yang

(57) ABSTRACT

During the conventional temperature swing adsorption (TSA) process, $NF_3$ co-adsorbed with the impurities is vented during regeneration. This invention is a novel TSA cycle in which the co-adsorbed $NF_3$ is recovered. In this novel TSA cycle, a control scheme is used to stop the adsorption prior to the saturation of the adsorber with impurities and use a recovery purge gas (either co-current or counter-current) to release the co-adsorbed $NF_3$ off the saturated adsorber. The effluent of the inert purge gas can be combined with the effluent of the on-stream vessel or can be recycled to the feed of the on-stream vessel. 10%-100% of the co-adsorbed $NF_3$ is recovered and made available as product in this novel TSA cycle. Thus the overall process yield of $NF_3$ is increased. The removing of the co-adsorbed $NF_3$ from the adsorber also prevents adsorber degradation thus prolonging the useful life of the adsorber.

20 Claims, 5 Drawing Sheets

RECOVERY OF NF3 FROM ADSORPTION OPERATION

BACKGROUND OF THE INVENTION $NF_3$ is a gas used in the manufacture of displays, semiconductors and photovoltaics. One undesirable property of $NF_3$ is its Global Warming Potential (GWP) which is 17,000 times greater than the GWP of $CO_2$.

Background atmospheric abundances and trends of nitrogen trifluoride ($NF_3$), a potent anthropogenic greenhouse gas, have been measured for the first time by Weiss, R. F., J. Mühle, P. K. Salameh, and C. M. Harth (2008), Nitrogen trifluoride in the global atmosphere, *Geophys. Res. Lett.*, 35, L20821, doi:10.1029/2008GL035913. The mean global tropospheric concentration of $NF_3$ has risen quasi-exponentially from about 0.02 ppt (parts-per-trillion, dry air mole fraction) at the beginning of the measured record in 1978, to a Jul. 1, 2008 value of 0.454 ppt, with a rate of increase of 0.053 ppt/yr, or about 11% per year, and an interhemispheric gradient that is consistent with these emissions occurring overwhelmingly in the Northern Hemisphere. This rate of rise corresponds to about 620 metric tons of $NF_3$ emissions globally per year, or about 16% of the global $NF_3$ production estimate of 4,000 metric tons/yr.

Concern about the growing concentration of $NF_3$ in the earth's atmosphere has created a need for $NF_3$ manufacturing methods which reduce or eliminate $NF_3$ emissions to the atmosphere.

Manufacturing methods for $NF_3$ often employ a temperature swing adsorption (TSA) to remove impurities which would otherwise solidify during the $NF_3$ cryogenic distillation unit operation.

In a conventional TSA cycle, a large portion of the $NF_3$ gas that is co-adsorbed with the impurities is vented during the regeneration step.

The following patents are representatives on refining $NF_3$ by adsorption.

U.S. Pat. No. 4,156,598 describes the conventional TSA process used in $NF_3$ refining: "Normally the adsorbers are operated until there is a detectable quantity of nitrous oxide leaving the adsorber at which time the adsorber is switched to the regenerated adsorber. The spent adsorber is then regenerated by permitting nitrogen to flow through the adsorber at an elevated temperature." Using this process the co-adsorbed $NF_3$ is vented along with the adsorbed impurities, thereby causing $NF_3$ to be released to the atmosphere and lowering the yield of $NF_3$.

U.S. Pat. No. 4,933,158 describes an improvement to U.S. Pat. No. 4,156,598 wherein the adsorber or the absorber is selected to try to maximize the adsorber capacity for the impurities so that the "the loss of $NF_3$ by the adsorption is much smaller". However, the amount of $NF_3$ lost per cycle is roughly equivalent since the capacity of $NF_3$ on the improved adsorber is similar. No process improvement is described to recover this co-adsorbed $NF_3$.

U.S. Pat. No. 5,069,887 describes a process where $NF_3$ is adsorbed and impurities ($CF_4$) are not adsorbed. In a second step, helium is used to purge the voids of impure $NF_3$. In a third step the pressure is reduced to desorb the $NF_3$ which is condensed in a LIN-cooled trap. Impurities are not co-sorbed so no recovery separation is needed and column effluent is not recycled to the feed.

U.S. Pat. No. 5,417,742 describes the process recovery of perfluorocarbons (PFC) from gas streams using adsorption in TSA or Pressure Swing Adsorption (PSA) modes. The PFC in a permanent gas are adsorbed on a zeolite, then feed flow is stopped and the temperature is raised and/or the pressure lowered to desorb the PFC which is transferred to further purification or sent to another process to be used captively. During the desorption step, the effluent is not combined with the impure gas stream. Impurities are not co-sorbed on the zeolite so no recovery separation is needed.

U.S. Pat. No. 5,425,240 describes an improved TSA process for the purification of $O_2$ in which the adsorption is performed at cryogenic temperatures. The regeneration step is conducted with product gas, i.e. pure $O_2$, so a substantial amount of purified product gas is vented.

The following patents are representatives on pressure swing adsorption (PSA) where the column purge is recycled to the feed.

U.S. Pat. No. 5,254,154 describes an improved PSA process in which during the regeneration step, the column is depressurized countercurrent and a portion of withdrawn residual gas is mixed with the impure gas to be treated. This would be ineffective with $NF_3$ since it is a strongly adsorbed species. The impurities are also more strongly adsorbed than $NF_3$ and would also not be removed with a depressurization step. For the $NF_3$ process, heating of the adsorber is a requirement during the regeneration portion of the cycle.

U.S. Pat. No. 5,620,501 describes an improved PSA process in which the void-space gas is stored in an intermediate vessel during evacuation of the adsorber (regeneration). This improvement requires that the product gas and sorbed impurity gas be easily removed by pressure reduction of the adsorber. Since both $NF_3$ and the adsorbed impurities are strongly bound on the adsorber, heat input is required.

U.S. Pat. No. 5,254,154 describes an improved PSA process in which during the regeneration step, the column is depressurized countercurrent and a portion of withdrawn residual gas is mixed with the impure gas to be treated. This would be ineffective with $NF_3$ since it is a strongly adsorbed species. The impurities are also more strongly adsorbed than $NF_3$ and would also not be removed with a depressurization step. For the $NF_3$ process, heating of the adsorber is a requirement during the regeneration portion of the cycle.

U.S. Pat. No. 5,620,501 describes an improved PSA process in which the void-space gas is stored in an intermediate vessel during evacuation of the adsorber (regeneration). This improvement requires that the product gas and sorbed impurity gas be easily removed by pressure reduction of the adsorber. Since both $NF_3$ and the adsorbed impurities are strongly bound on the adsorber, heat input is required.

This invention is a novel TSA cycle in which 10-100% of the co-adsorbed $NF_3$ is recovered. In the TSA cycle, a control scheme is used to stop the adsorption prior to the saturation of the adsorber with impurities and use an inert purge gas (either co-current or counter-current) to release 10-100% of the $NF_3$ off the saturated adsorber. The effluent of the inert purge gas can be combined with the effluent of the on-stream vessel or can be recycled to the feed of the on-stream vessel.

The benefits of this novel TSA cycle is that 10%-100% of the co-adsorbed $NF_3$ is not vented to the atmosphere but made available as product. Thus the overall process yield of $NF_3$ is increased.

An additional benefit is in prolonging the useful life of the adsorber. When heated rapidly with adsorbers during the regeneration step in a conventional TSA, $NF_3$ can decompose and react with the adsorber structure thereby degrading the material's performance in adsorbing impurities. The recovery step removes the $NF_3$ in a controlled fashion reducing or preventing adsorber degradation.

BRIEF SUMMARY OF THE INVENTION

A process for removing at least one impurity from a crude $NF_3$ gas stream in a system having at least two vessels each containing an adsorber, comprising steps of:

flowing the crude $NF_3$ gas stream through the first adsorber in the first vessel to selectively adsorb the at least one impurity;

redirecting the flow of the crude $NF_3$ gas stream through the second adsorber in the second vessel after a predetermined time or when effluent of the first adsorber reaches a predetermined level of the at least one impurity;

flowing a recovery purge gas through the first adsorber to selectively desorb co-adsorbed $NF_3$ from the first adsorber;

discontinuing the flow of the recovery purge gas when a predetermined time, or when effluent of the recovery purge gas reaches a predetermined level of the at least one impurity or a predetermined percentage of co-adsorbed $NF_3$;

flowing a regeneration purge gas through the first adsorber to purge adsorbed at least one impurity and remaining co-adsorbed $NF_3$ from the first adsorber; and discontinuing the flow of the regeneration purge gas.

10-100% of the co-adsorbed $NF_3$ is recovered by passing the recovery purge gas through the first adsorber.

The process further comprises the steps of redirecting the flow of the crude $NF_3$ gas stream back through the first adsorber in the first vessel after a predetermined time or when effluent of the second adsorber reaches a predetermined level of the at least one impurity;

flowing the recovery purge gas through the second adsorber to selectively desorb the co-adsorbed $NF_3$ from the second adsorber;

discontinuing the flow of the recovery purge gas when a predetermined time or when effluent of the recovery purge gas reaches a predetermined level of the at least one impurity or a predetermined percentage of co-adsorbed $NF_3$;

flowing the regeneration purge gas through the second adsorber to purge adsorbed at least one impurity and remaining co-adsorbed $NF_3$ from the second adsorber; and discontinuing the flow of the regeneration purge gas.

DETAILED DESCRIPTION OF THE INVENTION

Figure 1:
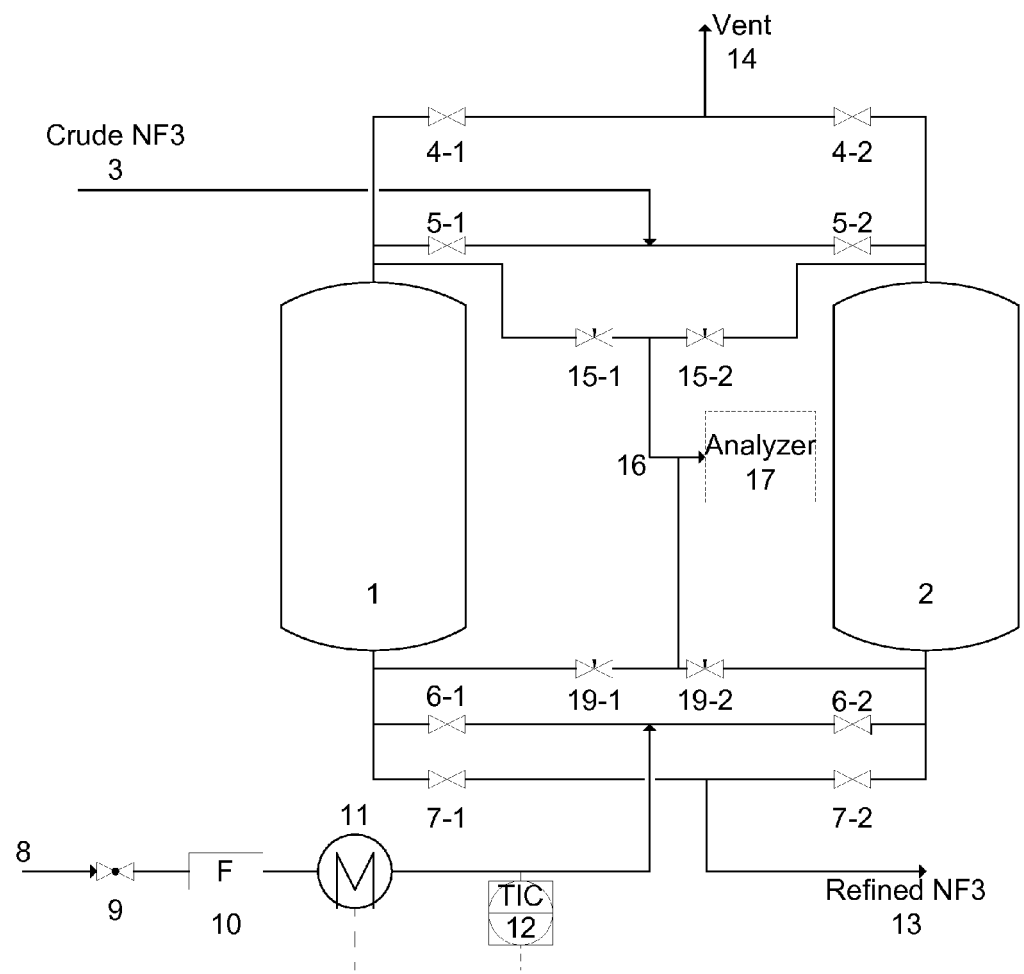
FIG. 1 shows a schematic apparatus for recovering of $NF_3$ with countercurrent flow.

The present invention discloses a novel TSA cycle. It teaches how to recover the $NF_3$ in the traditional Temperature Swing Adsorption (TSA) process for the purification of $NF_3$. The invention is independent of the synthesis method for the $NF_3$ and is also independent of any previous or subsequent purification unit operations (for example, wet scrubbers to remove hydrolyzable impurities, distillation to remove non-adsorbable impurities).

The system will be described as comprising two parallel arranged columns or vessels (column and vessel are interchangeable), each containing an adsorbent or adsorber (adsorbent and adsorber are interchangeable). However, the invention is not limited to a system having two vessels and two adsorbers, and may have more than two vessels and two adsorbers.

A conventional TSA process consists of two steps: adsorption and regeneration. The novel TSA process in the present invention has an additional step, recovery, between the adsorption and regeneration steps. The novel TSA process consists of three steps adsorption, recovery and regeneration In the adsorption step, an impure $NF_3$ feed stream (the crude $NF_3$) containing adsorbable impurities is passed through the first adsorber in the first vessel. The adsorber preferentially adsorbs the adsorbable impurities thereby substantially removing the adsorbable impurities from the $NF_3$. A portion of the $NF_3$ is also co-adsorbed. This comprises the adsorption step which is continued until either a predetermined processing time has elapsed or the impurities breakthrough the adsorber into the adsorber effluent at an unacceptable concentration. The impure $NF_3$ feed flow is then redirected to the second adsorber in the second vessel.

In the recovery step, 10-100% of the co-adsorbed $NF_3$ is recovered by passing a recovery purge gas, usually an inert purge gas through the first vessel, either counter-current or co-current, under the appropriate conditions to substantially desorb the adsorbed $NF_3$ while only minimally desorbing any adsorbed impurities and combining the effluent inert purge gas with the impure $NF_3$ feed stream directed to the on-stream second vessel. The recovery step is continued for a predetermined time, or when effluent of the recovery purge gas reaches either a predetermined level of the at least one impurity, or a predetermined percentage of co-adsorbed $NF_3$; such as from 10% to 100%. 100% indicates all of the $NF_3$ is recovered, In the final regeneration step, a flow of regeneration purge gas, usually an inert purge gas heated to above the reversal temperature of the adsorbed impurities is vented through the vessel to remove the adsorbed impurities and remaining co-sorbed $NF_3$ to complete the TSA cycle.

The "reversal temperature" used here is well defined in the art. For a reference, please see Yang, R., *Gas Separation By Adsorption Processes,* Boston, Butterworths, 1987, pp 171-172.

In another embodiment the adsorption step is stopped short of impurity breakthrough leaving the bottom portion of the first adsorber with additional capacity for the adsorbable impurities.

In the subsequent recovery step, 10-100% of the co-adsorbed $NF_3$ is recovered by passing a purge gas co-current through the first vessel and monitoring the effluent for $NF_3$ and desorbed impurities at the vessel outlet. The purge gas effluent from the recovery vessel is blended with the effluent from the on-stream vessel and sent directly to subsequent unit operations. The bottom unused portion of the recovery adsorber will adsorb the desorbing impurities, so the vessel effluent will contain only the inert purge and $NF_3$.

Optionally, when an impurity is detected as breaking through, the recovery vessel effluent could be blended with the crude feed of the on-stream vessel as described above to further capture additional $NF_3$ without sending the desorbing impurity downstream.

Once a predetermined recovery time has elapsed, the desorbing impurity reaches a predetermined concentration, or a predetermined percentage of co-adsorbed $NF_3$ is recovered, the regeneration step is conducted similarly to the previous embodiment.

In the current $NF_3$ purification processes, the recovery step minimizes the amount of $NF_3$ vented to the atmosphere, increases the overall process yield of $NF_3$, and extends the useable life of the adsorber by limiting degradation caused by residual $NF_3$ during the regeneration step.

Typical impurities removed by adsorption in $NF_3$ manufacturing processes include $N_2O$, $CO_2$, $H_2O$, $OF_2$, $SF_6$, $CF_4$, $C_2F_6$ and combinations thereof.

Typical adsorbers used in $NF_3$ manufacturing processes that selectively adsorb the impurities might also co-adsorb $NF_3$. The adsorbers are any one which is known in the art. The adsorber preferably is an aluminosilicate zeolite selected from those having the FAU, MOR, CHA, OFF, ERI, FER, GME, LEV, EMT, BEA, MAZ, LTA, LTL, MFI, MEL, MTW, MEI, MFS, and NES frameworks or combinations of these. Examples include Na-MOR, Ca-LTA, Na-FAU and combinations thereof.

A typical purge gas used in the recovery process is helium, nitrogen or argon. A typical regeneration gas is helium, nitrogen or argon. These serve only as examples, and the invention is not limited to these impurities, adsorbers, or regeneration gases.

The preferred combination of adsorber is Na-MOR; and the recovery and regeneration gas is $N_2$.

The recovery temperature ranges from −20 to 120° C., preferably 4 to 65° C., more preferably 4 to 30° C.

The recovery molar mass velocity (flow rate divided by the cross-sectional vessel area) ranges from 0.2 to 40 kg-mol/m² hr, preferably 0.5 to 15 kg-mol/m² hr, and most preferably 1 to 7 kg-mol/m² hr. The recovery gas residence time ranges from 0.1 to 25 minutes, preferably 0.3 to 10 minutes and most preferably 0.7 to 5 minutes. The recovery gas pressure ranges from 0.2 to 3 atm.

The regeneration temperature ranges from 35 to 450° C.

The analyzer may be any one of several methods useful in quantifying $NF_3$ and adsorbable impurity concentrations including but not limited to gas chromatography, Infrared spectroscopy, or mass spectrometry.

There are several specific flow path options in the process and several embodiments as described below.

One embodiment of the invention is illustrated in FIG. 1.

FIG. 1 shows schematically an apparatus to practice the recovery step with countercurrent flow.

The apparatus comprises two vessels 1 and 2 that containing adsorbers, an inlet conduit 3 for the crude $NF_3$, an outlet conduit 13 for the refined $NF_3$, a vent conduit 14 for waste gas, another inlet conduit 8 is for both a recovery and a regeneration purge gas such as supplying an inert gas, a flow element 10 to control the recovery/regeneration gas flow, and a heating element 11 and heating control system 12 to heat the recovery/regeneration purge gas as well as an optional $NF_3$/impurity analyzer 17. Two vessels are provided so that one vessel can be on-stream while the other vessel is in the recovery or regeneration step or on standby allowing for continuous operation.

The process cycle including the countercurrent recovery step is as follows.

During the Adsorption step, crude $NF_3$ gas stream flows in from 3, to the adsorber in vessel 1 through valve 5-1, then out of vessel 1 to outlet 13 through valve 7-1. Flow through adsorber in vessel 1 is continued until breakthrough of the adsorbed impurities in the adsorber effluent as determined by run time or by detection of the impurities at optional analyzer 17 through valve 19-1.

Once the breakthrough of the adsorbed impurities in the adsorber effluent is determined, valves 5-2 and 7-2 are opened. Valve 5-1 remains open but valve 7-1 is closed to allow the crude $NF_3$ to flow through the adsorber in vessel 2. Vessel 2 is now on-stream. Vessel 1 is in the preparation of recover.

The recovery step is initiated by flowing recovery purge gas coming from inlet conduit 8 through the adsorber in vessel 1 by opening valves 9 and 6-1. The recovery purge gas flow is set with 10 and recovery temperature is set with 12. When the recovery purge gas passes through the first vessel, substantially desorbs the adsorbed $NF_3$ while only minimally desorbing the adsorbed impurities.

The effluent gas, or recovery gas from the adsorber, that is, the purge gas containing $NF_3$ and a low concentration of one or more impurities is out from vessel 1. The effluent gas combines with the feeding crude $NF_3$ gas stream through the open valve 5-1 and then is directed together with the feeding crude $NF_3$ gas stream to the on-stream second vessel for the adsorption step.

An optional $NF_3$/impurity analyzer 17 may be utilized to monitor recovery progress by opening valve 15-1.

The recovery step may be run for a set time or governed by the $NF_3$/impurity concentrations in the recovery gas as observed at the analyzer 17 through valve 19-1. Once 10-100% of the adsorbed $NF_3$ is removed from adsorber in vessel 1 and bled into the onstream vessel 2 through valve 5-1, the recovery purge gas is turned off at 9, valve 5-1 is closed and valve 4-1 is opened.

The regeneration step is initiated by opening 9 and restarting the regeneration purge gas flow. The regeneration purge gas flows through valve 6-1, the adsorber in vessel 1, valve 4-1 and out the vent conduit 14 by setting the regeneration purge gas flow with 10 and recovery temperature with 12.

Once the adsorbed impurities and remaining co-adsorbed $NF_3$ are removed from the adsorber in vessel 1 and conducted out through the vent 14, heating element 11 is turned off. After vessel 1 is cooled to ambient temperature the regeneration purge gas flow is reduced or turned off and vessel 1 is on standby until the on-stream vessel 2 becomes saturated. Once vessel 2 is saturated, the vessel 1 is placed onstream, and the $NF_3$ co-adsorbed on adsorber in vessel 2 is now recovered prior to regeneration in a similar fashion.

Figure 2:
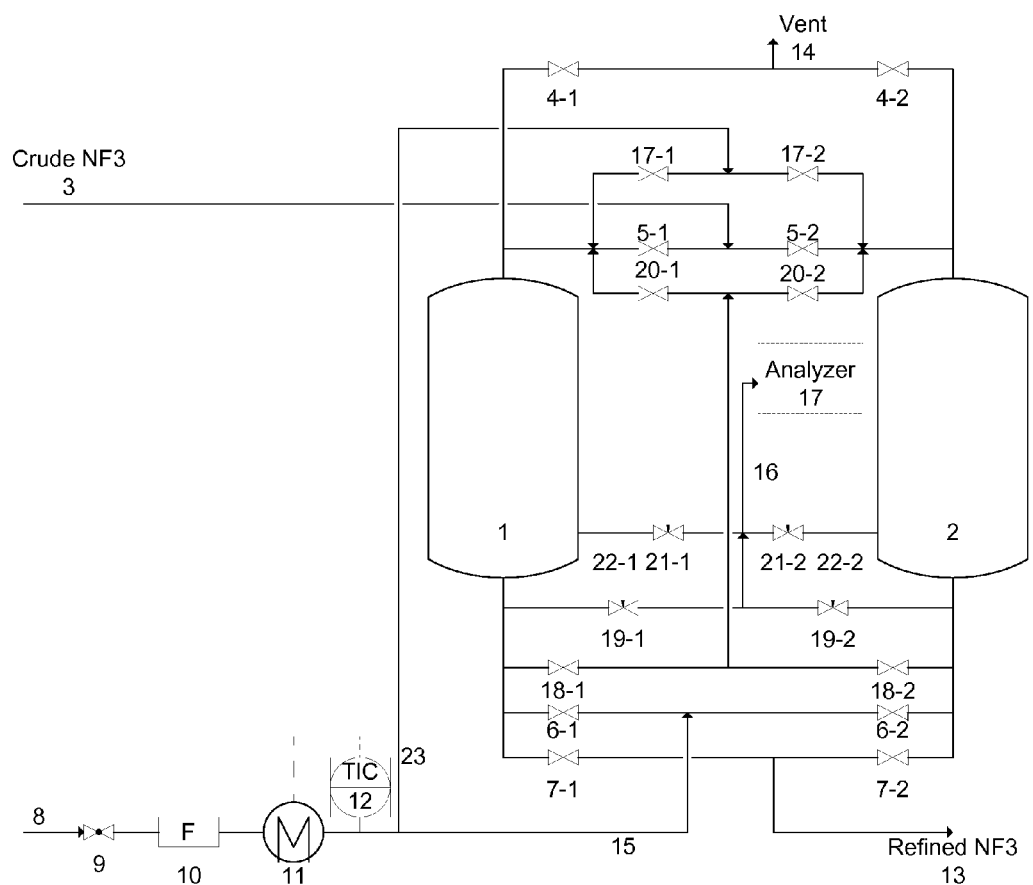
FIG. 2 shows a schematic apparatus for recovering of $NF_3$ with cocurrent flow.

Another embodiment of the invention is illustrated in FIG. 2.

FIG. 2 shows schematically an apparatus to practice the recovery step with cocurrent flow.

The main parts of the apparatus are identical to the embodiment illustrated in FIG. 1 except conduit 23 is added to allow recovery gas to flow co-current through the adsorbers in the vessels. An optional mid-vessel analysis tap, 22, can be added to leave a downstream portion of the adsorber free of adsorbed impurities to facilitate the $NF_3$ recovery step.

The process cycle including the co-current recovery step is as follows.

During the Adsorption step, crude $NF_3$ gas stream flows in from 3, to the adsorber in vessel 1 through valve 5-1, then out of vessel 1 to outlet 13 through valve 7-1. Flow through adsorber in vessel 1 is continued until breakthrough of the adsorbed impurities in the adsorber effluent as determined by run time or by detection of the impurities at optional analyzer 17 through valve 19-1, or by detection of the impurities at the optional mid-vessel tap 22-1 at analyzer 17 through valve 21-1.

Once the breakthrough of the adsorbed impurities in the adsorber effluent is determined, valves 5-2 and 7-2 are opened. Valves 5-1 and 7-1 are closed to allow the crude $NF_3$ to flow through the adsorber in vessel 2. Vessel 2 is now on-stream. Vessel 2 is in the preparation of recover.

The recovery step is initiated by flowing recovery purge gas coming from inlet conduit 8 (by opening valve 9), through conduit 23, passing the adsorber in vessel 1 (by opening valve 17-1). The recovery purge gas flow is set with 10 and recovery temperature is set with 12. When the recovery purge gas passes through the first vessel, substantially desorbs the adsorbed $NF_3$ while only minimally desorbing the adsorbed impurities.

The effluent gas, or recovery gas, that is, the purge gas containing $NF_3$ and a low concentration of one or more impurities is out from vessel 1 and into the adsorber in vessel 2 through the opening of valves 18-1 and 20-2.

The effluent gas combines with the feeding crude $NF_3$ gas stream through the open valve 5-2 and then is directed to the on-stream second vessel for the adsorption step.

An optional $NF_3$/impurity analyzer 17 may be utilized to monitor progress through valve 19-1.

If the optional mid-vessel tap 22 is employed to leave a portion of the adsorber free of adsorbed impurities, optionally the recovery purge gas can flow through the adsorber in vessel 1, substantially desorb the adsorbed $NF_3$ and then be blended with the refined $NF_3$ from vessel 2 by opening 17-1 and 7-1.

If the optional step is employed of flowing the recovered $NF_3$ directly to conduit 13, the recovery gas flow can be redirected through vessel 2 as described above after a set time or governed by the $NF_3$/impurity concentrations in the recovery gas as observed at the optional analyzer 17 through valve 19-1.

The recovery step may be run for a set time or governed by the $NF_3$/impurity concentrations in the recovery gas as observed at the optional analyzer 17 through valve 19-1.

Once 10-100% of the adsorbed $NF_3$ is removed from the adsorber in vessel 1, the recovery/regeneration purge gas is turned off at 9, and valves 7-1, 17-1, 18-1, 20-2 are closed. Valves 6-1 and 4-1 are opened.

The regeneration step is initiated by opening 9 and restarting the regeneration purge gas flow. The purge gas flows through 15, valve 6-1, the adsorber in vessel 1, valve 4-1 and out the vent conduit 14 by setting the regeneration purge gas flow with 10 and recovery temperature with 12.

Once the adsorbed impurities and remaining co-adsorbed $NF_3$ are removed from the adsorber in vessel 1 and conducted out through the vent 14, heating element 11 is turned off. After vessel 1 is cooled to ambient temperature the regeneration purge gas flow is reduced or turned off and vessel 1 is on standby until the on-stream vessel 2 becomes saturated. Once vessel 2 is saturated, the vessel 1 is placed onstream, and the $NF_3$ co-adsorbed on adsorber in vessel 2 is now recovered prior to regeneration in a similar fashion.

These two embodiments show economical two-adsorber systems in FIGS. 1 and 2. If the back pressure restrictions of the on stream vessel flow does not allow for the blending of the effluent from the recovery vessel to the feed of the on stream vessel, a three-vessel system can be employed where the effluent from the recovery vessel is sent to a third vessel (the standby vessel). The standby vessel is a vessel with regenerated adsorber. Once the recovery operation is complete, flow to the standby vessel is halted and the heated regeneration of the recovery vessel is initiated. Once impurities have broken through the on stream vessel, the vessels identities are changed: the standby vessel becomes the on-stream vessel, the recovery vessel (now regenerated) becomes the standby vessel and the on stream vessel becomes the recovery vessel.

WORKING EXAMPLES

A system described by FIG. 1 containing two vessels was used in the working examples. Two vessels were filled with Na-MOR to purify crude $NF_3$ containing 70% $NF_3$, 20% $N_2$, 10% $O_2$ and 100 ppm $N_2O$. The impurity to be removed was $N_2O$.

The crude $NF_3$ gas was flowed through vessel 1 until the analyzer 17 detected 1 ppm $N_2O$ in the effluent of vessel 1. Then, the crude $NF_3$ gas flow was switched to vessel 2 and vessel 1 went through a recovery and regeneration operations as described by the following examples.

Example 1

Figure 3:
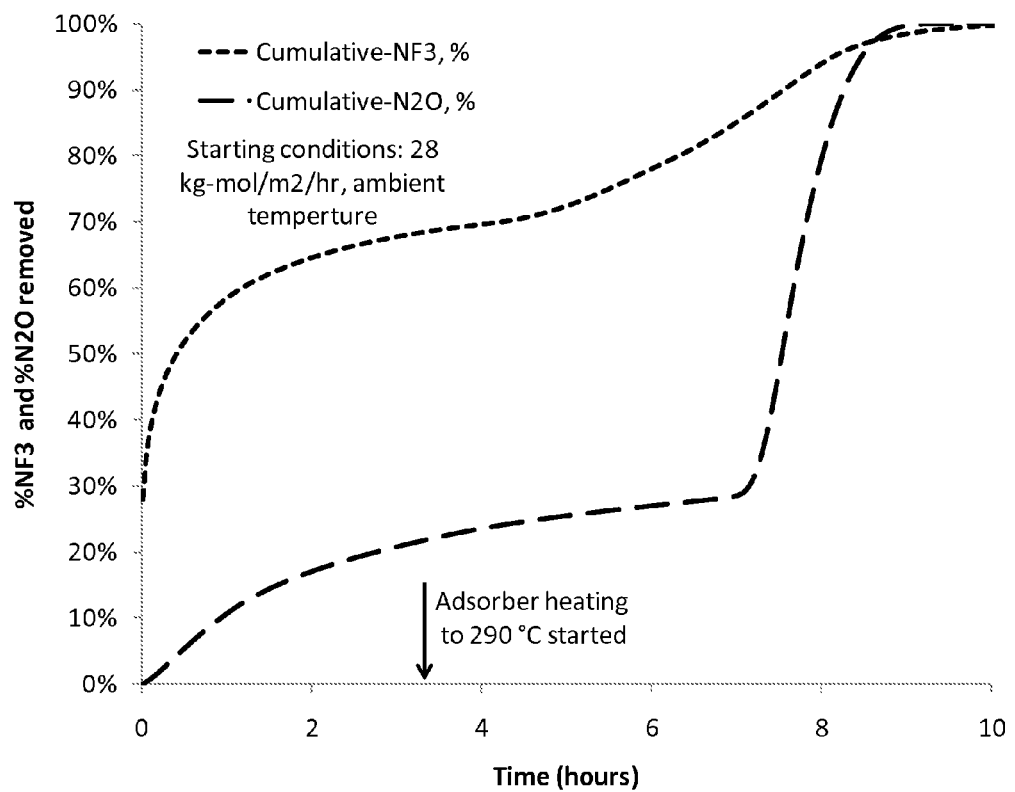
FIG. 3 shows a normalized recovery of % $NF_3$ and % $N_2O$ as a function of time for Example 1.

A nitrogen purge gas was flowed counter-current through vessel 1 at a molar mass velocity of 28 kg-mol/m$^2$ hr with a residence time of 0.17 min and 1.1 atm pressure at ambient temperature for 3.5 hours (recovery operation) and then heated to 290° C. (regeneration operation). A gas chromatograph measured the concentration of $NF_3$ and $N_2O$ in the nitrogen effluent. The known flow rate with the measured concentrations of $NF_3$ and $N_2O$ allowed the integrated amounts of $NF_3$ and $N_2O$ in the nitrogen effluent to be calculated. The aggregate amounts of $NF_3$ and $N_2O$ detected at a given time were normalized to the total amount of $NF_3$ and $N_2O$ detected over the entire analysis period. These normalized amounts plotted versus time were shown in the annotated FIG. 3.

Example 2

Figure 4:
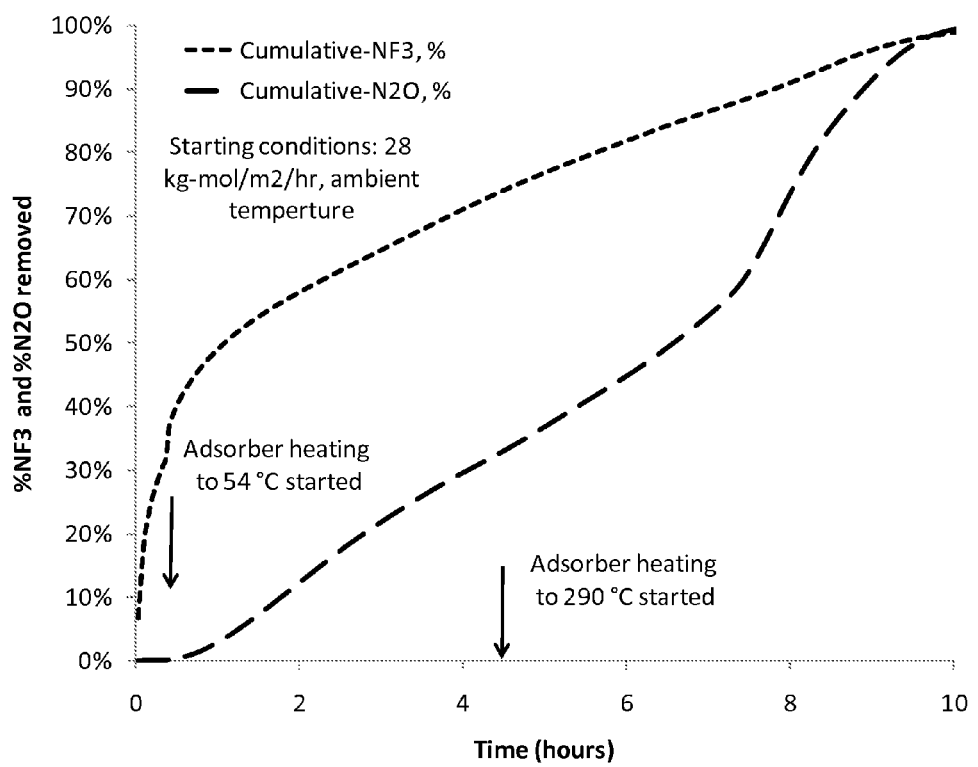
FIG. 4 shows a normalized recovery of % $NF_3$ and % $N_2O$ as a function of time for Example 2.

A nitrogen purge gas was flowed counter-current through vessel 1 at a molar mass velocity of 28 kg-mol/m$^2$ hr with a residence time of 0.17 min and 1.1 atm pressure at 54° C. for 4.5 hours (recovery operation) and then heated to 290° C. (regeneration operation). Analytical data were acquired and plotted as in Example 1. The normalized $NF_3$ ad $N_2O$ amounts plotted versus time were shown in the annotated FIG. 4.

Example 3

Figure 5:
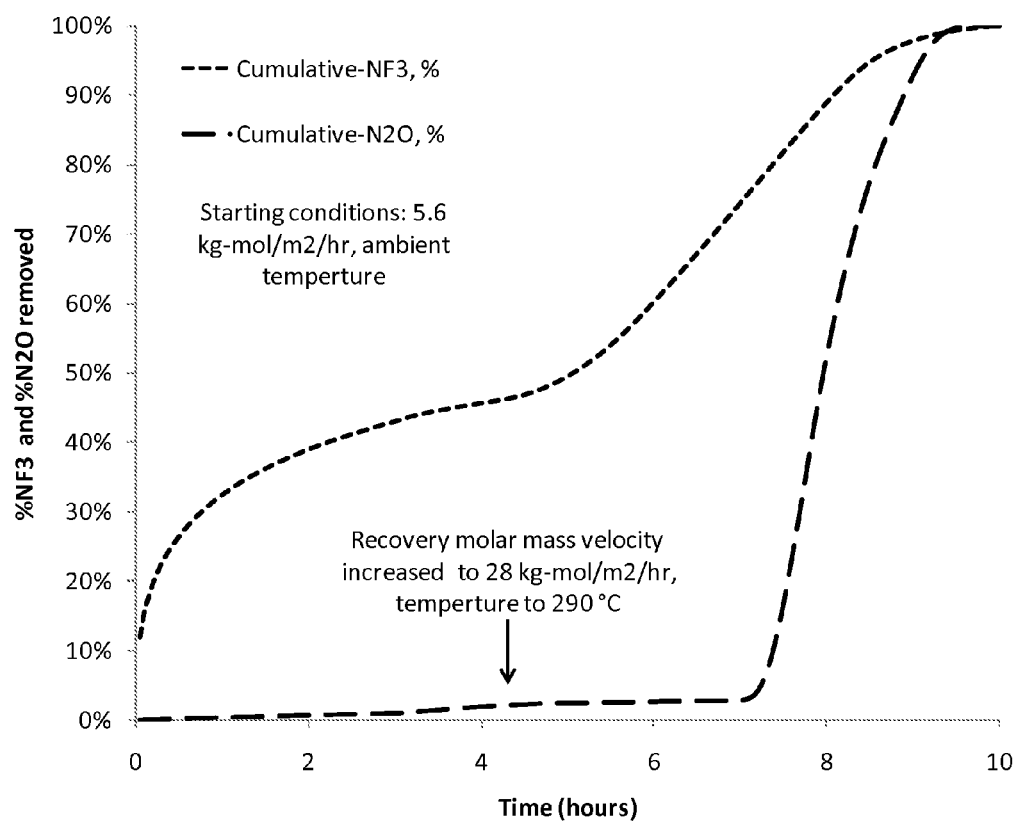
FIG. 5 shows a normalized recovery of % $NF_3$ and % $N_2O$ as a function of time for Example 3.

A nitrogen purge gas was flowed counter-current through vessel 1 at a molar mass velocity of 5.6 kg-mol/m$^2$ hr with a residence time of 0.87 min and 1.1 atm pressure at ambient temperature for 4.3 hours (recovery operation) and then the molar mass velocity was increased to 28 kg-mol/m$^2$ hr and temperature to 290° C. (regeneration operation). Analytical data were acquired and plotted as in Example 1. The normalized $NF_3$ ad $N_2O$ amounts plotted versus time were shown in the annotated FIG. 5.

The recovery step or operation shown in the examples above may be run for a set time or governed by the $NF_3$/impurity concentrations in the recovery gas as observed at the optional analyzer.

The regeneration step or operation can be performed as described before.

The examples illustrated the surprising result that the most efficient $NF_3$ recovery was obtained when starting with a lower, ambient temperature flow. The $NF_3$ desorption was shown to be diffusion controlled where the $N_2O$ desorption was substantially equilibrium controlled.

An equilibrium-controlled desorption has a stronger dependence on temperature versus a diffusion controlled desorption. Thus, in Example 2 versus Example 3, heating the recovery purge gas to an intermediate temperature of 54° C. did enhance the desorption of $NF_3$, but simultaneously more strongly enhanced the desorption of $N_2O$. However, the desorption of $N_2O$ in the recovery operation is not desirable.

Example 1 versus Example 3 has shown that an equilibrium-controlled desorption was more strongly enhanced by higher flow.

Thus, the recovery purge gas preferably has a lower temperature ambient −40° C., more preferably 4-30° C.; and lower molar mass velocity 0.5 to 15 kg-mol/m² hr, and most preferably 1 to 7 kg-mol/m² hr, in order to desorb the adsorbed $NF_3$ efficiently while only minimally desorbing the adsorbed impurities.

While the regeneration purge gas (could be the same gas as the recovery purge gas) preferably has a higher temperature 50-450° C. and higher molar mass velocity 5-50 kg-mol/m² hr, in order to desorb the impurities.

When the recovery purge gas and the regeneration gases are the same, the temperature of the regeneration purge gas is higher than the temperature of the recovery purge gas. The flow rate of the regeneration purge gas is also higher.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

The invention claimed is:

1. A process for removing at least one impurity from a crude $NF_3$ gas stream in a system having at least two vessels each containing an adsorber, comprising steps of:
   flowing the crude $NF_3$ gas stream through the first adsorber in the first vessel to selectively adsorb the at least one impurity;
   redirecting the flow of the crude $NF_3$ gas stream through the second adsorber in the second vessel after a predetermined time or when effluent of the first adsorber reaches a predetermined level of the at least one impurity;
   flowing a recovery purge gas through the first adsorber to selectively desorb co-adsorbed $NF_3$ from the first adsorber;
   discontinuing the flow of the recovery purge gas when a predetermined time or when effluent of the recovery purge gas reaches a predetermined level of the at least one impurity or a predetermined percentage of co-adsorbed $NF_3$;
   flowing a regeneration purge gas through the first adsorber to purge adsorbed at least one impurity and remaining co-adsorbed $NF_3$ from the first adsorber; and
   discontinuing the flow of the regeneration purge gas.

2. The process of claim 1 is a temperature swing adsorption (TSA).

3. The process of claim 1 wherein the effluent of the recovery purge gas from the first adsorber is combined with (1) effluent of the second adsorber; or (2) the crude $NF_3$ gas stream directed to the second adsorber when the effluent of the recovery purge gas reaches a predetermined level of the at least one impurity.

4. The process of claim 1 wherein the at least one impurities is selected from the group consisting of $N_2O$, $CO_2$, $H_2O$, $OF_2$, $SF_6$, $CF_4$, $C_2F_6$ and combinations thereof.

5. The process of claim 1 wherein the adsorber is an aluminosilicate zeolite having a framework selected from the group consisting of FAU, MOR, CHA, OFF, ERI, FER, GME, LEV, EMT, BEA, MAZ, LTA, LTL, MFI, MEL, MTW, MEI, MFS, NES and combinations thereof.

6. The process of claim 5 wherein the adsorber is selected from the group consisting of Na-MOR, Ca-LTA, Na-FAU, and combinations thereof.

7. The process of claim 1 wherein the recovery purge gas is selected from the group consisting of helium, nitrogen and argon, and the regeneration purge gas is selected from the group consisting of helium, nitrogen and argon.

8. The process of claim 1 wherein the flowing of the recovery purge gas through the first adsorber is in the same direction (cocurrent flow) as the flowing of the crude $NF_3$ gas stream through the first adsorber.

9. The process of claim 1 wherein the flowing of the recovery purge gas through the first adsorber is in the opposite direction (countercurrent flow) as the flowing of the crude $NF_3$ gas stream through the first adsorber.

10. The process of claim 1 wherein the flowing of the regeneration purge gas through the first adsorber is in the same direction (cocurrent flow) as the flowing of the crude $NF_3$ gas stream through the first adsorber.

11. The process of claim 1 wherein the flowing of the regeneration purge gas through the first adsorber is in the opposite direction (countercurrent flow) as the flowing of the crude $NF_3$ gas stream through the first adsorber.

12. The process of claim 1 wherein the the recovery purge gas has a temperature ranging from −20 to 120° C.

13. The process of claim 12 wherein the the recovery purge gas has a temperature ranging from 4 to 65° C.

14. The process of claim 12 wherein the the recovery purge gas has a temperature ranging from 4 to 30° C.

15. The process of claim 1 wherein the the regeneration purge gas has a temperature ranging from 35 to 450° C.

16. The process of claim 1 wherein the the recovery purge gas has a molar mass velocity ranging from 0.2 to 40 kg-mol/m² hr and a residence time ranging from 0.1 to 25 minutes.

17. The process of claim 16 wherein the the recovery purge gas has a molar mass velocity ranging from 0.5 to 15 kg-mol/m² hr and a residence time ranging from 0.3 to 10 minutes.

18. The process of claim 16 wherein the the recovery purge gas has a flow rate ranging from 1 to 7 kg-mol/m² hr and a residence time ranging from 0.7 to 5 minutes.

19. The process of claim 1 wherein 10-100% of the co-adsorbed $NF_3$ is desorbed from the first adsorber in the step of flowing the recovery purge gas through the first adsorber.

20. The process of claim 1 further comprising steps of:
   redirecting the flow of the crude $NF_3$ gas stream back through the first adsorber in the first vessel after a predetermined time or when effluent of the second adsorber reaches a predetermined level of the at least one impurity;
   flowing a recovery purge gas through the second adsorber to selectively desorb co-adsorbed $NF_3$ from the second adsorber;
   discontinuing the flow of the recovery purge gas when a predetermined time or when effluent of the recovery purge gas reaches a predetermined level of the at least one impurity or a predetermined percentage of co-adsorbed $NF_3$;
   flowing a regeneration purge gas through the second adsorber to purge adsorbed at least one impurity and remaining co-adsorbed $NF_3$ from the second adsorber; and
   discontinuing the flow of the regeneration purge gas.

* * * * *